Sept. 13, 1932.  C. E. BILLS  1,877,382
INSOLATING APPARATUS
Filed Aug. 8, 1930  2 Sheets-Sheet 2
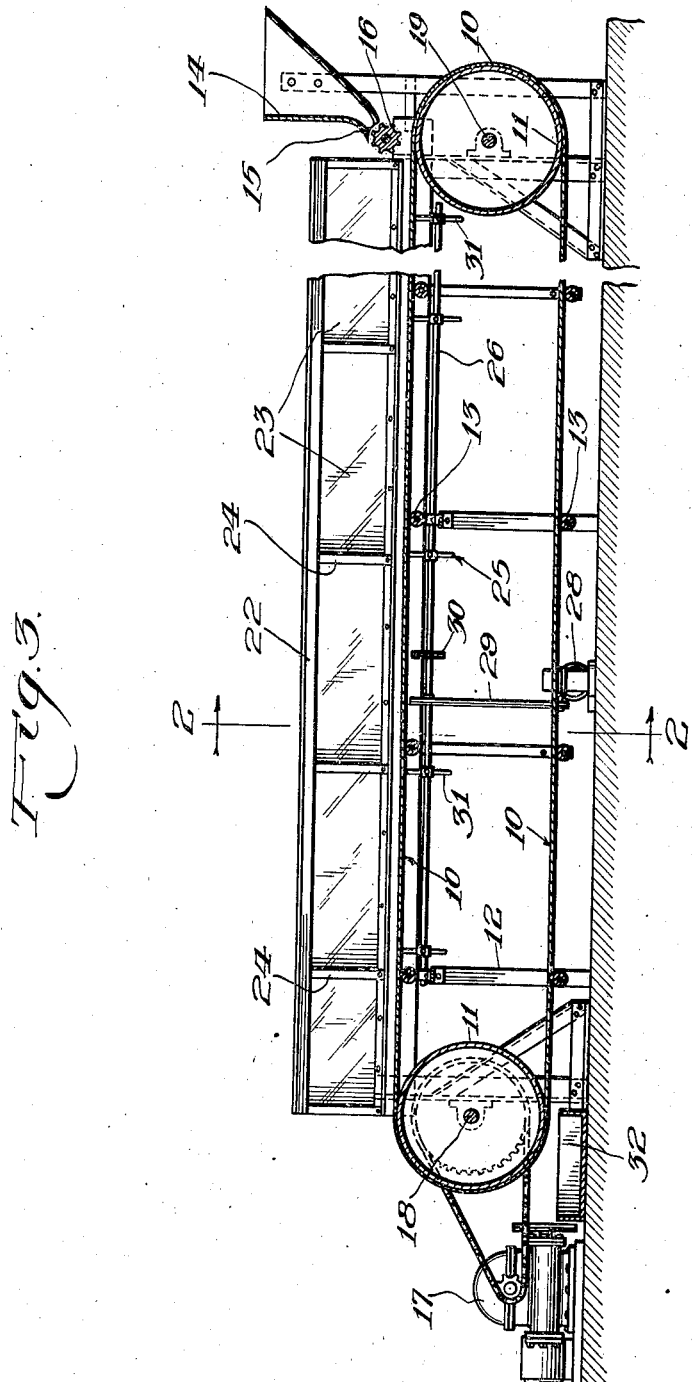

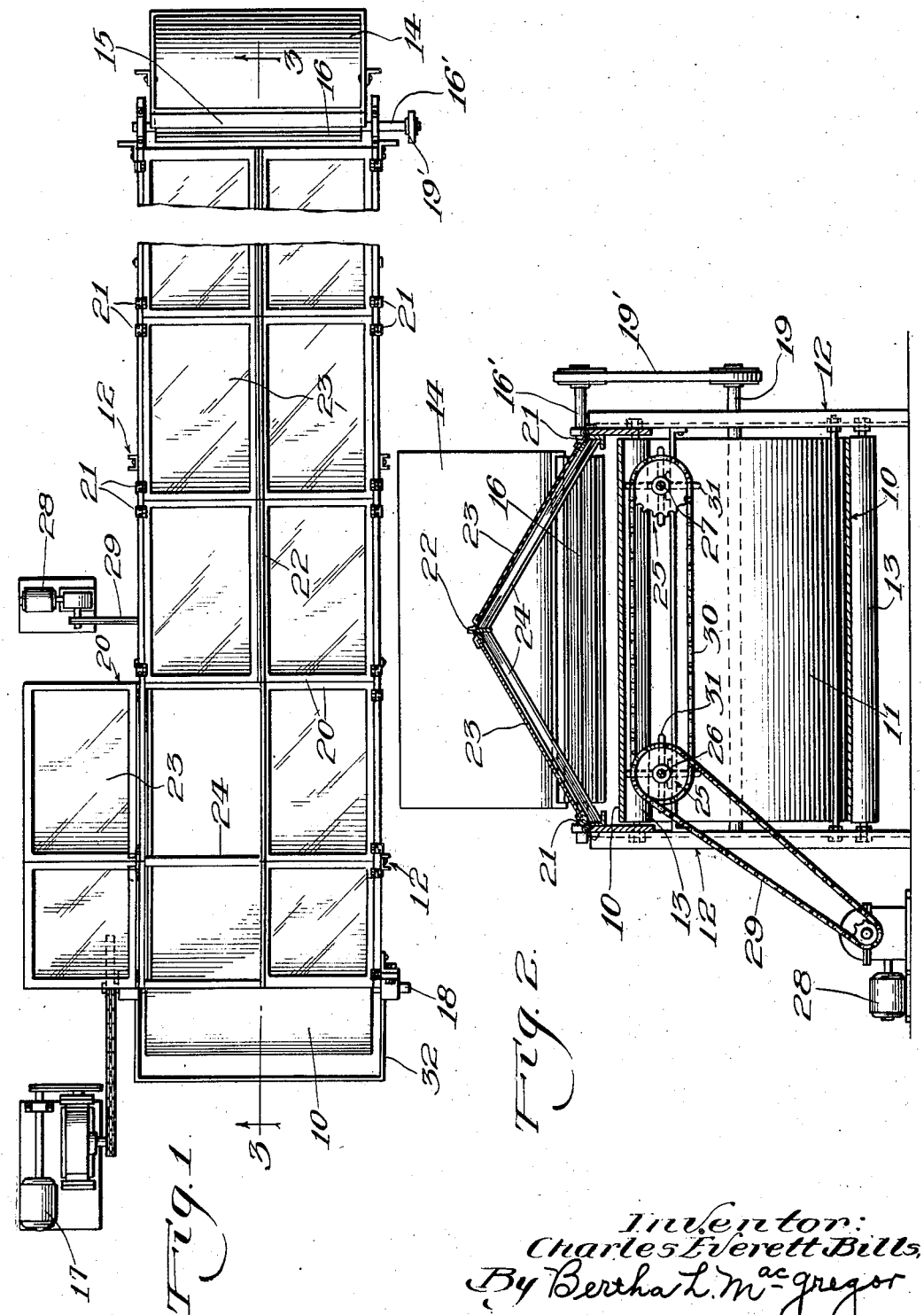

Patented Sept. 13, 1932

1,877,382

UNITED STATES PATENT OFFICE

CHARLES EVERETT BILLS, OF EVANSVILLE, INDIANA, ASSIGNOR TO MEAD JOHNSON & COMPANY, OF EVANSVILLE, INDIANA, A CORPORATION OF INDIANA

INSOLATING APPARATUS

Application filed August 8, 1930. Serial No. 474,042.

This invention relates to a process of insolating yeast and to apparatus adapted for use in the insolation process. The process has been made the subject of a divisional application co-pending herewith and the claims in this application will be directed to the insolating apparatus.

Yeast contains ergosterol which when irradiated by ultra violet light has imparted to it vitamin D, an anti-rachitic substance. The quantity of ergosterol in yeast depends upon the species of yeast selected and the culture medium used in growing it. While any type of yeast containing ergosterol may be used for the purposes of the present invention, it is desirable to use yeast rich in ergosterol. Brewers' yeast grown in an aerated medium has been found well adapted for this purpose.

When ergosterol is irradiated as is customary, either in an ether solution or in a dry state, by artificially produced ultra violet rays, the activation curve rises quickly to a maximum and then falls very sharply, and therefore it is important that the activation treatment be terminated when this maximum is reached in order to prevent decomposition. I have found that in my insolation process the activation curve is a very flat one and that it is not essential that the insolation treatment be terminated at any particular moment.

One explanation for the lack of decomposition in treating yeast and ergosterol by my insolation process may be the absence of short wave lengths in sunlight, it being understood that there are practically no wave lengths less than 2900 A. U. in sunlight, whereas artificial ultra violet ray lamps produce not only all the wave lengths of sunlight, but a great many more, particularly those below 2900 A. U.

By the use of my process of insolation as applied to yeast, it has been found practical and economical to produce a product many times more potent than cod liver oil by continuing the treatment for approximately thirty minutes under the conditions herein described, but the exposure may be extended beyond this period without substantial damage.

Preferably the yeast to be insolated is in the form of a fine powder but it must not be so fine as to be an impalpable powder which would stick or cling to a supporting surface. Preferably the powdered yeast should pass through a standard thirty mesh screen.

The yeast is first dried in a vacuum drum drier from which the material may be scraped off in flakes. A spray drier may be used if the resulting powder is not too fine. The flakes scraped from the drum drier are ground to a desired fineness, after which the powdered yeast is ready to be exposed to solar rays. The exposure is preferably made by distributing the powdered yeast on a table or other support, in a thin layer of about one millimeter, the material being protected from wind during the exposure to solar rays. The exposure is continued for about thirty minutes or more and it has been found desirable to agitate the powdered yeast during exposure. The powdered, insolated yeast is then collected into a container. Its keeping qualities are similar to those of yeast. When added to other food products such as bread, cereal foods and the like, the insolated yeast contributes vitamin B1 and B2, as well as the newly created vitamin D, to the products to which it is added.

One form of apparatus which has been found efficient for carrying out my process is shown in the accompanying drawings.

Fig. 1 is a plan view of apparatus embodying my invention.

Fig. 2 is a transverse vertical section taken in the plane on the line 2—2 of Fig. 3, looking in the direction indicated by the arrows.

Fig. 3 is a longitudinal, vertical section taken in the plane of the line 3—3 of Fig. 1, looking in the direction indicated by the arrows.

In that embodiment of my invention shown in the drawings, 10 indicates a continuous belt or conveyor which may be about one hundred feet long and about a yard wide. The conveyor may be made of sheet metal, such as tin, or any other suitable material. Preferably it has a smooth surface. The conveyor is supported on drums 11, mounted in a frame 12. Transverse roller bearings 13 also mounted in frame 12 support the belt intermediate the drums 11.

Adjacent one end of the frame is a hopper 14 which is as wide as the conveyor and is provided in its bottom with a narrow slot 15 as long as the conveyor is wide. Adjacent the slot 15 is a distributing device 16, mounted on a shaft 16'. This distributor may be in the form of a grooved roll, as shown; or a movable screen, or other suitable distributor familiar in the art may be used. The distributing device is so arranged that the powdered yeast in the hopper will be deposited on the conveyor in a thin layer preferably of not greater thickness than one millimeter.

A motor 17 is operatively connected with a shaft 18 on which one drum 11 is mounted, for imparting movement to the conveyor 10, the other drum 11 being mounted on a rotatable shaft 19. The speed of operation is such that the conveyor will travel from the hopper to the opposite end of the frame in the time during which it is intended to expose the material to be insolated. The moving conveyor rotates the drum 11 on shaft 19 and the shaft 19 and the distributor shaft 16' are operatively connected by belt 19' to actuate the distributor 16.

On the frame 12, above the conveyor 10, is a gable roof or cover comprising a plurality of rectangularly shaped frames 20, hinged at 21 to the sides of the frame 12, and meeting along the longitudinal median line of the gable on the ridge bar 22. In the frames 20 are mounted sheets of cellophane 23 or other material sufficiently transparent for the intended purpose. Trusses 24 assist in supporting the frames 20. This structure protects the yeast from wind without interfering with the efficiency of the solar rays.

Means for imparting vibrations to the conveyor are indicated in the drawings, the same consisting of cam wheels 25 mounted on longitudinally extending shafts 26, 27. The shaft 26 is operatively connected with a motor 28 by a sprocket chain 29 and the shaft 27 is operatively connected with shaft 26 by sprocket chain 30. The arms 31 of the wheels 25 intermittently contact with the conveyor 10 and impart tremors to it. A receptacle for receiving the insolated yeast as it falls from the conveyor is indicated at 32.

It will be understood that a non-traveling table may be used in place of the conveyor 10 in which case the material would be distributed on the stationary support and be scraped from the table at the conclusion of the treatment.

Obviously, changes in construction may be made without departing from the scope of my invention and I do not desire to be limited to the exact form and arrangement shown and described except as set forth in the appended claims.

I claim:—

1. Insolating apparatus comprising a support for material to be insolated, and a cover located above the support, forming a substantially closed chamber between the cover and support, said cover comprising a plurality of frames and sheets of material transparent to ultra violet light mounted in the frames, said frames extending upwardly toward each other from the sides of the apparatus and from approximately the horizontal plane in which the upper lap of the conveyor is located.

2. Insolating apparatus comprising a frame, an endless conveyor mounted on the frame, means for operating the conveyor, a hopper located adjacent one end of the frame, means adjacent the hopper for distributing the material to be insolated in a thin layer on the conveyor, and a cover mounted on the frame to extend over the conveyor and forming a chamber between the cover and upper lap of the conveyor, said cover comprising a plurality of frames, sheets of material transparent to ultra violet light mounted in the frames and oppositely inclined trusses for supporting the frames, the lower margins of said frames being hinged to the sides of the apparatus frame, the hinges being located in substantially the same horizontal plane as the upper lap of the conveyor.

3. Insolating apparatus comprising a frame, an endless conveyor mounted on the frame, means for operating the conveyor, a hopper located adjacent one end of the frame, means adjacent the hopper for distributing the material to be insolated in a thin layer on the conveyor, a cover mounted on the frame above the conveyor and forming a chamber between the cover and upper lap of the conveyor and means comprising a plurality of rotatable cam wheels for intermittently contacting with the conveyor for imparting tremors to the conveyor, said cover consisting of a plurality of rectangularly shaped frames and sheets of material transparent to ultra violet light mounted therein, said cover frame members being hinged to the sides of the apparatus frame in approximately the horizontal plane in which the upper lap of the conveyor is located.

In testimony, that I, claim the foregoing as my invention, I affix my signature, this 31st day of July, 1930.

CHARLES EVERETT BILLS.